April 20, 1948.  A. S. ATKINSON  2,439,788
METHOD AND APPARATUS FOR OPTIMUM ECONOMY OPERATION
OF INTERNAL-COMBUSTION ENGINES
Filed May 31, 1945  3 Sheets-Sheet 1

INVENTOR.
ALLEN S. ATKINSON
BY
Ralph L Chappell
ATTORNEY

April 20, 1948.   A. S. ATKINSON   2,439,788
METHOD AND APPARATUS FOR OPTIMUM ECONOMY OPERATION
OF INTERNAL-COMBUSTION ENGINES
Filed May 31, 1945   3 Sheets-Sheet 2

INVENTOR.
ALLEN S. ATKINSON
BY
Ralph L Chappell
ATTORNEY

April 20, 1948.    A. S. ATKINSON    2,439,788
METHOD AND APPARATUS FOR OPTIMUM ECONOMY OPERATION
OF INTERNAL-COMBUSTION ENGINES
Filed May 31, 1945    3 Sheets-Sheet 3

Inventor
ALLEN S. ATKINSON
By M. O. Hayes
Attorney

Patented Apr. 20, 1948

2,439,788

UNITED STATES PATENT OFFICE 2,439,788

METHOD AND APPARATUS FOR OPTIMUM ECONOMY OPERATION OF INTERNAL-COMBUSTION ENGINES

Allen S. Atkinson, Haddonfield, N. J.

Application May 31, 1945, Serial No. 596,939

17 Claims. (Cl. 123—119)

(Granted under the act of March 3, 1883, as amended April 30, 1928; 370 O. G. 757)

This invention relates to new and useful improvements in carburetion systems for internal combustion engines used to power aircraft, and more particularly to a novel method and apparatus for adjusting the fuel-air ratio of an internal combustion engine to provide the most economical engine operation from the standpoint of fuel consumption for any given cruise power condition.

In long distance flights of both commercial and military aircraft, and particularly on long over-the-ocean flights where adverse weather conditions may be encountered, conservation of the fuel supply carried by the plane is extremely important. It is highly desirable, therefore, that on such flights the pilot be able to operate the plane at the most economical engine operation for any given cruise power condition so that the maximum distance of flight is obtained on a given fuel supply.

In order to establish optimum economy in engine operation, it is necessary to establish the fuel mixture so that the ratio of the variable, brake horsepower, to the variable, fuel flow $$\left(\text{i. e.} \frac{BHP}{\text{fuel flow}}\right)$$

is at its maximum value. This is quite difficult with present engine installations because, although there are several indications of the engine power output under the operator's observance such as, for example, engine torque-meter pressure, engine speed, indicated air speed and the like, there normally is nothing to indicate to the operator the amount of fuel flowing to the engine. Also, according to the present practice, optimum economy of engine operation is sought to be established by changing the rate of fuel flow while maintaining constant the amount of air flowing to the engine or, in other words, constant throttle position, but since the horsepower output of an engine is dependent upon both absolute fuel flow, and the fuel-air ratio, it is impossible to determine the power change by leaning the fuel mixture since the power changes also as a result of the change in the rate of fuel flow. Thus, for each rate of fuel flow, there exists a fuel-air mixture at which optimum economy occurs. Therefore, under present methods, the rate of fuel flow is different for each fuel-air mixture, and the horsepower output of the engine, which is the indication that the pilot must observe to establish the point of optimum economy, at each different fuel-air mixture, is different for each rate of fuel flow, so that there is no common basis of comparison.

With the foregoing in mind, the principal object of the present invention is to provide a novel method and apparatus that is selectively operable to provide optimum economy of engine operation for any given cruise power condition of an airplane.

Another object of the invention is to provide a novel mechanism for use in conjunction with conventional aircraft engine carburetion systems that is operable at will to establish a condition of constant fuel flow to the engine.

Another object of the present invention is to provide a novel method for operating aircraft engines at optimum economy for any given power condition which comprises establishing a condition of constant fuel flow to the engine and then adjusting the fuel-air ratio of the engine to provide the maximum power output thereof for the established constant rate of fuel flow.

A further object of the invention is to provide novel selective control means for apparatus operable in conjunction with a conventional type carburetor system to establish a condition of constant fuel flow therethrough to the engine.

These and other objects of the invention, and the various features and details of the construction and operation thereof, are hereinafter fully set forth and described with reference to the accompanying drawings, in which.

Figure 1:
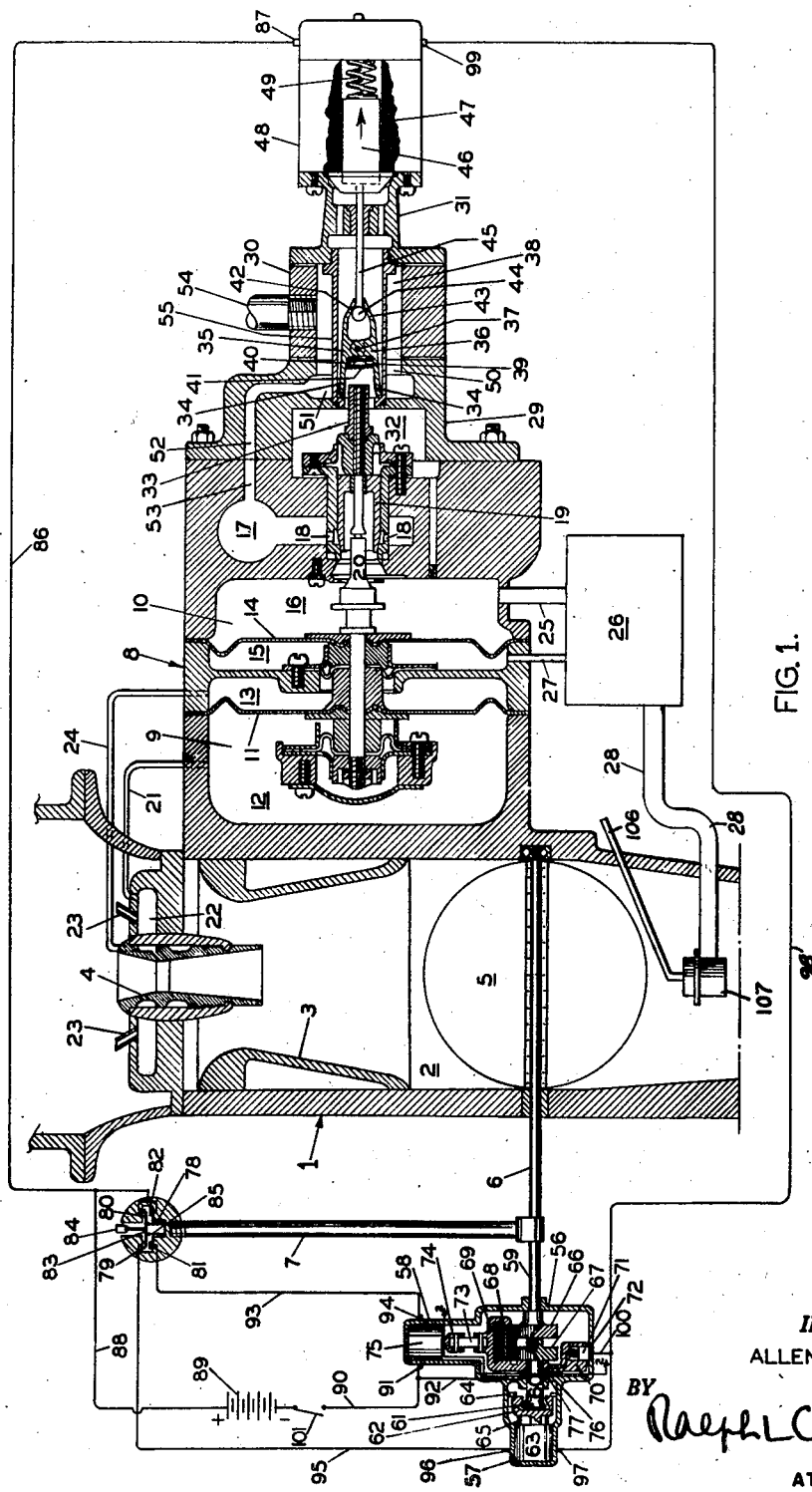
Fig. 1 is a view, partially in section and partially diagrammatic, illustrating one embodiment of the present invention in conjunction with conventional type carburetion and air induction systems for aircraft internal combustion engines.

Referring now to the drawings, and particularly Fig. 1 thereof, the present invention is shown in conjunction with a conventional type aircraft engine carburetion system having associated therewith a conventional type air induction system. The air induction system, designated generally by reference numeral 1, comprises the customary throttle body 2, Venturi throat 3, and boost Venturi system 4. Also provided in the throttle body 2 is the usual throttle valve 5 which is fixed on a shaft 6 for rotation within the duct 2 by actuation of a throttle lever 7, in the usual manner.

The illustrated carburetion system comprises the conventional pressure regulator body 8, which is provided with adjacent compartments 9 and 10 therein, respectively, the compartment 9 being sub-divided by means of a flexible diaphragm 11 to provide pressure chambers 12 and 13 respectively, and the compartment 10 being sub-divided by a flexible diaphragm 14 to provide pressure chambers 15 and 16, respectively. In normal operation of the carburetor, fuel enters the chamber 16 from a fuel inlet manifold 17 through a port 18, the opening through which is controlled by means of a sleeve type poppet valve 19 that is carried by a valve stem 20 which extends centrally through the compartments 9 and 10 and the flexible diaphragm members 11 and 14, respectively, the said diaphragms being secured to said valve stem 20 to actuate the latter as hereinafter described. The chamber 12 is subjected to the impact pressure in the air induction system 1 through a tube 21 that leads from a manifold 22 which receives the impact pressure through suitable tubes 23. In similar manner, the chamber 13 is subjected to the pressure in the boost venturi 4 through a tube 24.

Fuel entering the chamber 16 from the inlet manifold 17 flows from said chamber through a tube or pipe connection 25 to the fuel control body 26 of the carburetion system, and the adjacent chamber 15 of the pressure regulator is subjected to the metered fuel pressure in the fuel control body 26 through a pipe or tube connection 27. From the fuel control body 26, fuel flows through a tube or pipe 28 to the conventional valve controlled discharge nozzle 107, Fig. 4, for injection into the intake air passing inwardly of the body 2. The fuel control body 26 is of conventional type having the customary automatic lean and automatic rich adjustments well known in the art.

Figure 4:
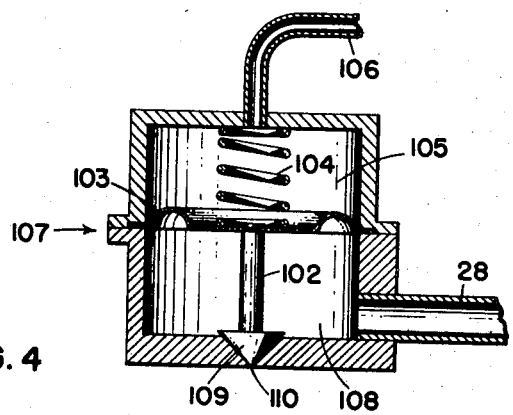
Fig. 4 is a sectional view of a valve controlled discharge nozzle.

The valve controlled discharge nozzle 107, Fig. 4, is of conventional design and well known in the art. The description of its operation is set forth only for the purpose of clarity. The discharge nozzle 107 has a housing divided into two chambers, the upper chamber 105 being vented to the atmosphere by line 106; the lower chamber 108 receives the fuel from the control body 26 through tube or pipe 28 and discharges it through orifice 110 into the intake manifold. Interposed in the housing and forming the chambers is diaphragm 103 to which is connected valve stem 102 having valve 109 on its one end. Spring 104 located in chamber 105 is biased to exert pressure on valve 109 through the diaphragm and the valve stem.

In operation, fuel pressure is built up in chamber 108 until it is equal to the sum of the air pressure in chamber 105 plus the force of spring 104. An increase in the fuel pressure beyond this sum of pressures creates an unbalance of pressures in the chambers which causes the diaphragm to move valve 109 to the open position, permitting the fuel to flow into the intake manifold through orifice 110. The valve remains in open position until the pressure in chamber 108 drops to that which it was originally, or, until the pressures in the chambers balance. Since the rate of change in the orifice area, through which the fuel is discharged, is high with the spring in deflection; and since the magnitudes of variation in pressure in the region of discharge are small for the range of a given air flow adjustment, the variations in the fuel discharge pressure with respect to the region of discharge pressure are negligible and for all practical purposes a constant discharge pressure is maintained.

In normal operation of the conventional type carburetion system described, actuation of the stem 20 to open and close the poppet valve 19 with respect to the fuel inlet port 18 takes place in accordance with changes in the differential between the air impact pressure existing in chamber 12 and the boost venturi pressure existing in the chamber 13. Accordingly, it will be apparent that an increase in the air impact pressure in chamber 12 will cause a flexure of the diaphragm 11 to the right, with respect to Fig. 1, thereby actuating the stem 20 and valve 19 in the same direction to increase the opening of intake port 18 and increase the rate of fuel flow therethrough into the chamber 16 and fuel control body 26. This causes an increase in the pressure in chamber 16 which will continue to increase until pressure differential between chambers 16 and 15 is the same as the differential between the pressures existing in the chambers 12 and 13, thereby establishing an equilibrium condition in which the valve 19 remains fixed with respect to the inlet port 18 until a condition of unbalance is created between the pressures acting on the flexible diaphragms 11 and 14 caused, for example, by a change in either or both the air impact and boost venturi pressures in the chambers 12 and 13, respectively.

However, in normal operation of such a carburetion system since the rate of fuel flow is different for each fuel-air mixture, and the horsepower output of the engine at each such fuel-air mixture is different for each rate of fuel flow, it is substantially impossible for the pilot of the plane to adjust the fuel-air ratio of the engine or engines to provide the most economical engine operation for a given cruise power condition.

Accordingly, the present invention contemplates the provision in conjunction with the carburetor systems of aircraft engines, of a novel method and apparatus for locking or securing the valve element 19 in a set or fixed position with respect to the inlet port 18 to thereby establish a condition of constant fuel flow to the engine and enable the pilot of a plane to adjust the fuel-air ratio of the engine to provide maximum power output thereof for the established constant rate of fuel flow thereto.

Referring again to Fig. 1 of the drawings, there is illustrated one embodiment of apparatus that is operable effectively to lock or secure the valve element 19 in a fixed position with respect to the inlet port 18 to establish a condition of constant fuel flow to the engine as described. Such an apparatus may comprise for example, a base member 29, an intermediate housing member 30 and a stanchion like structure 31; the said members 29, 30 and 31 being secured together in the relation shown with the base member 29 thereof secured to the carburetor pressure regulator body 8 in place of the customary cover member which has been removed.

As shown in Fig. 1, the outer end portion of the valve stem 20 is threaded and extends into an annular cavity 32 provided in the adjacent face of the base member 29 of the valve locking mechanism. Threadably secured upon the free end portion of the valve stem 20 is a sleeve 33 which extends coaxially therefrom with its outer or free end portion disposed intermediate the jaw portions 34 of a pair of levers 35 and 36, respectively. The levers 35 and 36 are mounted for pivotal movement in respectively opposite directions about a common pivot pin 37 disposed transversely of a cylindrical bore 38 provided in the housing member 30. Associated with each of the levers 35 and 36 are pins 40 and 39, respectively, which extend inwardly toward each other, and mounted on said pins 39 and 40 is a coil spring 41 that operates normally to urge said levers 35 and 36 in respectively opposite directions to maintain jaw portions 34 thereof in relatively spaced apart relation and free of engagement with the sleeve member 33 as shown in said Fig. 1. The opposite ends 42 and 43 of the levers 35 and 36 incline angularly inward as indicated, and engage the surface of a spherical element 44 which is positioned therebetween and carried by one end of a rod 45 that is slidably mounted in the member 31 and has its other end connected to a core member 46 axially movable within the coil 47 of a solenoid device 48 mounted endwise of the member 31 as shown.

Interposed between the outer end of the solenoid core 46 and the adjacent end wall of the solenoid 48 is a coil spring 49 that is operable when the solenoid coil 47 is de-energized to normally maintain the core 46, rod 45 and spherical element 44 in the positions shown in the drawing so that the spring 41 associated with the levers 35 and 36, respectively, maintains the jaw portions 34 thereof out of engagement with the sleeve member 33. The construction and arrangement of the levers 35 and 36, respectively, and the spherical element 44, is such that when the solenoid coil 47 is energized, the core 46 thereof is actuated in the direction of the arrow against the force of the spring 49 to cause the rod 45 and ball 44 to be moved in the same direction with the result that the latter effects a relative separation of the adjacent end portions 42 and 43 of the levers 35 and 36, thereby pivoting the latter in respectively opposite directions about the pivot pin 37 to clamp the jaw portions 34 thereof firmly upon the external surface of the sleeve 33, against the action of the coil spring 41.

With the jaw portion 34 of the levers 35 and 36 in clamping engagement with the sleeve 33, the latter, together with stem 20 and poppet valve 19, is restrained against further movement relative to the inlet port 18 in response to changes in the pressure differentials acting upon the flexible diaphragms 11 and 14. The valve element 19 thus is secured or locked in a fixed position with respect to the inlet port 18 so that the opening therethrough from the manifold 17 into the chamber 16 is fixed and a constant fuel flow is established to the fuel control body 26 and ultimately into the air induction system of the engine.

In the illustrated embodiment of the present invention, the bore 38 through the housing member 30 at its inner end registers with an opening 50 in the base member 29 that connects with a cavity 51 therein from which a passage 52 leads through said base to the end face thereof where it registers with the end opening of a like passage 53 in the pressure regulator 8; said passage 53 leading to the fuel intake manifold 17 previously described. Fuel is admitted to the bore 38 in the housing member 30 at fuel pump discharge pressure through a tube or pipe 54 and flows from the said bore 38 through cavity 51 and passages 52 and 53 into the manifold 17 from which it flows through the carburetion system to the engine in the manner herein previously described.

In order that fuel entering the bore 38 of the housing member 30 may be segregated from the operative mechanism for locking the valve 19 in fixed position with respect to the fuel inlet port 18, there is provided a sleeve member 55 that surrounds the rod 45 and the levers 35 and 36, respectively. This sleeve 55 has its opposite end portions secured in fluid sealing relation to the housing 30 and base member 29 so that fuel at pump discharge pressure entering the bore 38 through pipe 54 does not flow internally of the sleeve member 55 and into contact with the named operating parts of the locking mechanism.

Figure 5:
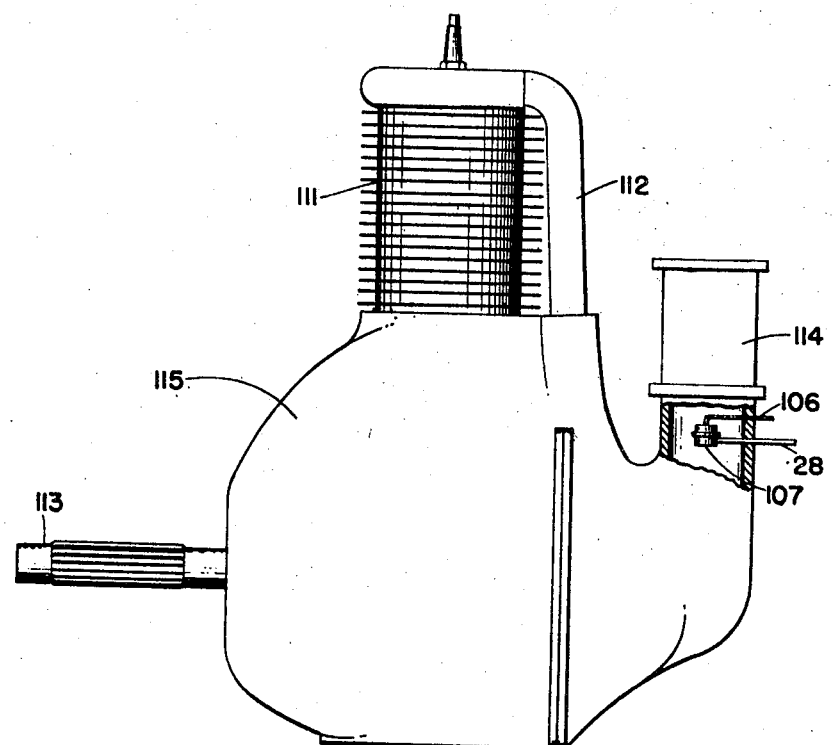
Fig. 5 is an elevational view partially in section illustrating an embodiment of the invention in conjunction with a conventional internal combustion engine.

Referring again to the drawings and particularly to Fig. 5, the present invention is shown in conjunction with an internal combustion engine 115 having the usual cylinders 111, intake manifold 112 and crankshaft 113. The conventional carburetor 114 embodying the present invention is mounted in the ordinary manner with the valve controlled discharge nozzle connected to the intake manifold at any suitable location.

In operation of an aircraft engine having a carburetion system provided with a carburetor valve locking mechanism embodying the present invention, and assuming that the pilot of the plane desires to obtain the most economical engine operation for the existing cruise power condition of the plane, the pilot first sets up the desired engine speed and manifold pressure in the customary manner, and the mixture control of the fuel system body 26 is set for automatic lean operation of the engine since this setting is near the point of best economy of engine operation. The pilot next closes a suitable switch in the circuit of the solenoid 48 to thereby energize the latter, thus locking the valve 19 in its existing position with respect to the inlet port 18, in the manner herein previously described, and establishing a condition of constant fuel flow through the carburetion system to the internal combustion engine. With the fuel flow made constant, the engine will operate according to the typical performance curve shown in Fig. 3 of the drawing and the pilot need only operate the throttle 5 by its lever 7 to adjust the torque of the engine, as indicated by the engine torquemeter on the instrument panel of the plane, to its maximum value in order to establish optimum economy conditions.

Figure 3:
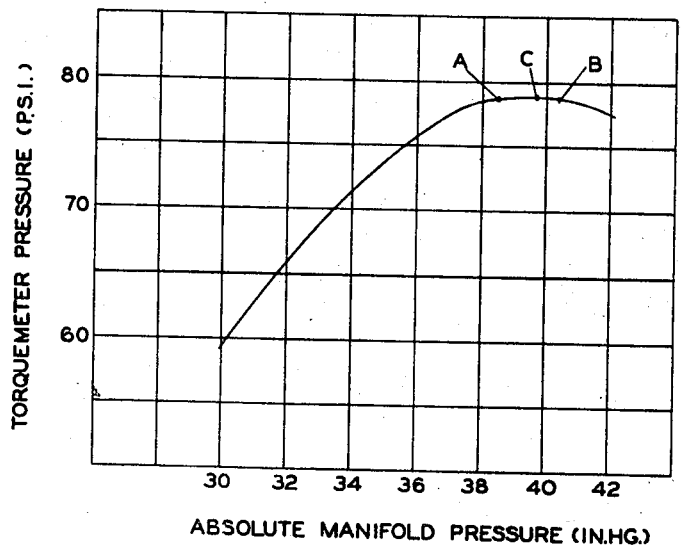
Fig. 3 is a graph illustrating certain operating characteristics of the present invention.

Adjustment of the engine torque to its maximum value may be accomplished by first closing the throttle 5 slightly and reducing the engine manifold pressure two or three inches until it is noted that the torquemeter pressure begins to drop, thus indicating that the engine is operating at a point somewhere to the left of point A on the curve shown in Fig. 3. The throttle 5 then is opened slightly to increase the engine manifold pressure in increments, for example, of one-half inch, it being necessary that the throttle remain stationary after each such increment of increase for a period long enough to allow the engine torquemeter pressure to stabilize. As the throttle 5 is opened in this manner, the engine manifold pressure will be increased until it has reached point A on the curve in Fig. 3, and as the throttle 5 is further opened, in the increments previously described, it will be noted that a point is reached at which the engine torque pressure does not increase as the engine manifold pressure is increased appreciably. As the throttle 5 is still further opened, in progressive increments as described, a point, for example, point B on the curve of Fig. 3, will be reached where the engine torquemeter pressure again begins to drop.

In this manner, the range of engine manifold pressure where no appreciable change in engine torquemeter occurs may be determined, and the throttle 5 is then closed slightly until the engine manifold pressure is reduced, for example to point C on the curve of Fig. 3, which is the point at which most economical engine operation takes place. This condition of optimum economy of engine operation will continue so long as the speed of the engine, the blower ratio, the air intake temperature, the airplane altitude and the spark plug gasket temperature remain constant, it being understood the fuel flow likewise is constant since valve 19 is locked in position.

On long cruises, and to correct for any changes which may occur in these variables, the procedure described above should be repeated periodically. Furthermore, if, when the point of maximum economy is reached, the manifold pressure is found to be excessively higher or lower than that existing at the original set engine conditions, the process should also be repeated and the manifold pressure that was established before locking the valve 19 in position should be increased or decreased in proportional amounts. Furthermore, if full open position of throttle 5 is reached before attaining the point of maximum economy the initial engine manifold pressure value should be reduced or the pilot may reduce the altitude of the airplane and repeat the entire procedure. In order to restore the carburetor to normal operation, it is necessary only to open the circuit to the solenoid 48, thereby de-energizing the latter, to release the valve 19 and permit it to function in the normal manner in response to changes in either or both the air impact and the boost Venturi pressures as previously described.

Use of the engine torquemeter for the purposes set forth, appears to be the most accurate over the entire operating range of the engine since engine torque is proportional to power at constant engine speed, and in conjunction with a constant speed propeller, torquemeter pressure is a direct indication of engine power. However, in lieu of the engine torquemeter, standard and other instruments may be employed. Thus, for example, at low speeds, where small changes in engine power effect a measurable change in air speed, the air speed indicator may be the most accurate means for establishing the desired operating point. On the other hand, with a fixed propeller pitch, where the engine speed is a good indication of engine power output, the engine tachometer may be effectively employed. In either event, when using the air speed indicator or the tachometer as an indication of engine power output, the procedure employed to establish best economy conditions, is the same as that described above with respect to the use of the engine torquemeter.

While any suitable switch device may be employed to control energization of the solenoid 48 of the valve locking mechanism, the danger exists of the possibility of the pilot "killing" the engine as the result of forgetting to de-energize the solenoid 48 and unlock the valve 19 before opening or closing the throttle 5 to an excessive degree. The pilots of modern commercial and military planes are confronted with so many instruments, controls and the like, that it is desirable to provide, in conjunction with the carburetor valve locking mechanism of the present invention, a control switch device therefor which is entirely fool-proof and safe in operation, and which eliminates entirely the possibility of the pilot "killing" the engine by opening or closing the throttle 7 to an excessive degree without releasing and rendering inoperative the valve locking mechanism.

Accordingly, therefore, the present invention contemplates the provision of novel switch means for controlling the electrical circuit containing the valve locking mechanism solenoid 48. Referring again to Fig. 1 as well as to Fig. 3 of the drawings, such a switch may comprise a casing structure comprising a main housing portion 56 and smaller housing portions 57 and 58, the latter extending laterally and vertically, respectively, from said main portion 56. Suitably journaled in the main housing portion 56 of the switch is a shaft 59, one end of which is suitably connected to the shaft 6 of the throttle 5 so that when the shaft 6 is rotated by actuation of the throttle lever 7 to open or close the throttle 5 a given distance, the shaft 59 of the switch mechanism will be rotated a like distance in the same direction. Suitably journaled in the opposite wall of the switch housing portion 56 is a shaft 60 arranged coaxially of the shaft 59 and connected thereto in a manner to permit relative rotation of said shafts 59 and 60 with respect to one another.

The shaft 60 extends into the lateral switch housing portion 57 and has secured on its outer end an outwardly beveled member 61 which constitutes, in effect, a brake drum element that normally rotates within a generally U-shaped brake shoe member 62 mounted for sliding movement within the housing portion 57 in a direction coaxially of the said shaft 60. Actuation of the brake shoe is effected by means of a solenoid 63 having a movable core member (not shown) to which the brake shoe 62 is connected, the arrangement being such that upon energization of the solenoid 63, the core member actuates the brake shoe 62 to the left with respect to Fig. 1 of the drawings, to engage the latter with the brake drum 61 on the shaft 60, to hold the latter against rotation. When the solenoid 63 is de-energized, the brake shoe 62 normally is held out of engagement with the brake drum 61 and against a stop 64 by means of a coil spring 65 that is interposed between the said brake shoe 62 and the adjacent solenoid 63 so that shaft 60 is free to rotate.

Mounted upon the shaft 59 for rotation therewith is a spur gear 66. Similarly fixed upon the shaft 60 is a like spur gear 67, and meshing with both of said gears 66 and 67 is a pinion 68 of smaller diameter that is rotatably carried by a spider frame 69. This spider 69 is rotatably mounted on shaft 60, and extending therefrom in the opposite direction from the pinion 68 is an arm portion 70, which is provided inwardly of its radial face with a recess in which is resiliently seated a brush contact member 71 arranged for contact with a fixed contact 72, mounted in the bottom portion of the main housing portion 56, when the spider 69 is in the substantially vertical position, for example, as best shown in Fig. 2 of the drawings.

Figure 2:
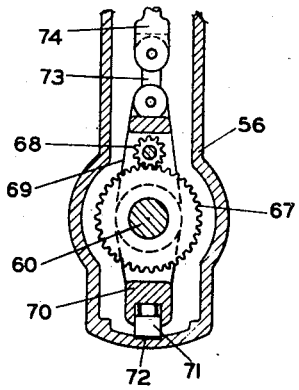
Fig. 2 is an enlarged fragmentary sectional view taken on line 2—2, Fig. 1.

The other end portion of the spider 69, which carries the pinion 68, is pivotally connected to one end of a link 73, the other end of which is pivotally connected to a yoke 74 that forms a part of the movable core member (not shown) of a solenoid device 75 in the housing portion 58, the arrangement being such that when the solenoid 75 is energized to actuate its movable core member, the latter acting through the link 73, operates to erect and hold the spider assembly in the vertical position shown in Fig. 2, with the brush contact 71 centered on the fixed contact 72, the spider remaining in centered position irrespective of rotation imparted to the spur gear 66 by the throttle lever 7, since the brake members 61 and 62 are disengaged and gear 67 is free to be rotated by pinion 68 without moving the spider 69.

Secured to the spider 69 and surrounding shaft 60 is a contact ring 76 which is arranged for engagement with a similar contact ring 77, that is fixed to the adjacent wall of the housing portion 56 of the switch casing structure. The electrical circuit for controlling the carburetor valve locking solenoid 47 as well as the solenoids 75 and 63 of the switch control mechanism is shown diagrammatically in conjunction with the apparatus in Fig. 1 of the drawings. In the present embodiment of the invention, the circuit and its included control mechanism is operated by means of a conventional type push button switch 78 mounted in the handle portion of the throttle lever 7. This switch 78 comprises two pairs of fixed contacts 79 and 80, and 81 and 82, respectively, together with a movable contact member 83 that is carried by a push button member 84 and actuable by the latter into engagement with one set of contacts 79, 80 or the other set of contacts, 81, 82. Spring means 85 are provided and arranged normally to maintain the movable contact member 83 in engagement with the fixed contacts 79, 80 as illustrated.

The fixed contacts 80 and 82 are electrically connected by a conductor 86 to one terminal 87 of the carburetor valve locking solenoid 48 and are also electrically connected by a conductor 88 to one side of a suitable source of electrical potential such as, for example, a storage battery 89, the other side of which is connected by a conductor 90 to one terminal 91 of the switch mechanism solenoid 75. From the conductor 90, a conductor 92 leads inwardly of the control switch housing portion 56 and is connected to the ring contact 77 therein. The other ring contact 76 is fixed on the spider 69 and is connected by a suitable conductor to the brush contact element 71.

The fixed contact 81 of the switch 78 is connected by a conductor 93 to the other terminal 94 of the solenoid 75. On the other hand, the fixed contact 79 is connected by a conductor 95 to one terminal 96 of the switch solenoid 63, and the other terminal 97 thereof is connected by a conductor 98 to the other terminal 99 of the valve locking solenoid 48. From the conductor 98, a conductor 100 leads to, and is electrically connected with, the fixed contact 72 in the housing portion 56 that is arranged for cooperative engagement with the brush contact 71 carried by the spider member 69 as previously described. A suitable safety switch 101 may be provided in the circuit by which the operator may open the circuit in the event the control switch mechanism should fail to function properly.

In operation of the valve locking mechanism of the present invention in conjunction with the control circuit embodying the switch mechanism herein described, when the pilot of the plane desires to establish a condition of constant fuel flow to the engine, the push button 84 of the switch 78 is depressed to engage the movable contact member 83 with the fixed contacts 81 and 82, respectively, thereby completing a circuit from the power source 89 through conductors 90, 88 and 93 to solenoid 75, thus energizing the latter, and through the conductor 92, ring contacts 77 and 76 to the brush contact 76. Energization of the solenoid 75 causes the core thereof to move upwardly with respect to Fig. 1 of the drawings thereby acting through the link 73 and spider 69 to center the brush contact 71 upon the fixed contact in the manner previously described, thus also completing a circuit through conductor 92, ring contacts 77 and 76, contacts 71 and 72, conductor 98 and conductor 86 to the solenoid 48 of the valve locking mechanism, thereby energizing the latter to actuate the locking mechanism and secure the valve 19 in a fixed position with respect to the inlet port 18 and establish a condition of constant fuel flow to the engine in the manner previously described.

It will be apparent, therefore, that as long as the push button 84 is depressed to maintain the described circuit through fixed contacts 81 and 82, the solenoid 48 will remain energized and valve 19 will remain locked in position with respect to the inlet port 18. This is so regardless of movement of the throttle lever 7 by the pilot of the plane since any such movement of the throttle lever 7, while operating through the shaft 59 of the control mechanism to rotate the gear 66, the pinion 68 and gear 67 on the shaft 60, will not disturb the centered position of the spider 69 because the solenoid 63 is de-energized and shaft 60, therefore, will rotate freely with respect to the brake shoe member 62 so that the spider 69, which is rotationally free of the shaft 60, is held centered upon the fixed contact 71 by the action of the solenoid 75 in the manner previously described.

With the solenoids 48 and 75 energized as described, and the valve 19 locked in fixed position with respect to the inlet port 18, the pilot of the plane, still holding the push button 84 depressed to maintain the movable contact 84 in engagement with the fixed contacts 81 and 82 manipulates the throttle lever 7 to adjust the throttle 5 in accordance with the procedure hereinbefore described, to establish maximum power output of the engine for the established constant rate of fuel flow. Having adjusted the throttle 5 to provide the most economical engine operation, the pilot may release the push button 84, thereby disengaging the movable contact 83 from the fixed contacts 80 and 82, and engaging said contact 83 with the fixed contacts 79 and 80. With the switch 78 in this position, the solenoid 48 remains energized to maintain the valve element 19 locked in position with respect to the fuel inlet port 18 although the solenoid 75 of the switch control mechanism is now de-energized thus releasing the spider 69 for limited pivotal movement circumferential of the shaft 60 in the manner hereinafter described.

It will be observed, however, that when the push button 84 is released as described, thereby deenergizing the solenoid 75, engagement of the movable contact 83 with the fixed contacts 79 and 80 establishes a circuit from the source 89 through conductor 88, switch 78 and conductor 95 as well as through conductors 90, 100 and 98 to the solenoid 63, thereby energizing the latter to cause the brake shoe member 62 to engage the brake drum 61 thus locking the shaft 60 against rotation to maintain the position of the spider 69 so that the brush contact 71 remains in engagement with the fixed contact 72, with the result that the circuit from the other side of the source 89 through the conductor 90, ring contacts 77 and 76 and the conductor 100 to conductor 98 remains unbroken.

With the switch mechanism and its associated electrical circuit in this condition, since the solenoid 75 is de-energized, should the pilot move the throttle lever 7 without again depressing the push button 84 of switch 78, such movement of the throttle lever 7, and, of course, of the shaft 59 will serve to rotate the gear 66 and pinion 68 with the result that, since shaft 60 and gear 67 are held in fixed position by inter-engagement of the brake drum 61 and brake shoe 62, under the influence of energized solenoid 63, such rotation of the gear 66 and pinion 68 will cause the spider 69 to rotate thereby disengaging the brush contact 71 from engagement with the fixed contact 72 and breaking the electrical circuit to both of the solenoids 48 and 63 with resulting disengagement of the locking mechanism so that the valve element 19 is free to move relative to the fuel inlet port 18, in accordance with the normal operation of the engine carburetion system. The switch mechanism and its associated electrical circuit are now in the original condition, and in order to relock the valve 19 in a fixed position with respect to the fuel inlet port 18, the procedure herein described must be repeated.

It will be apparent that the novel switch mechanism of the present invention provides an effective control for the solenoid 48 of the carburetor valve locking mechanism and that this switch mechanism and its associated electrical circuit is constructed and arranged so that when the valve 19 is locked in fixed position with respect to the fuel inlet port 18, the pilot of the plane cannot "kill" the engine by excessive manipulation of the throttle lever 7, since if he does so, failing to remember that the valve 19 is locked in position with respect to the inlet port 18, manipulation in either direction of the throttle lever 7 beyond a predetermined limited extent, will operate to displace the spider 69 and disengage the brush contact 71 from the fixed contact 72 in the manner described, to break the circuit to the solenoid 48, thereby de-energizing the latter and unlocking the valve element 19.

From the foregoing, it will be observed that the present invention provides a novel method and apparatus which is selectively operable to provide optimum economy of engine operation for any given cruise power condition of an airplane so that on long-distance flights the operator is able to operate the engine or engines thereof at optimum economy and obtain the maximum distance of flight on the given fuel supply. The invention also provides novel method and apparatus for use in conjunction with conventional aircraft carburetion systems, that is operable at will to establish condition of constant fuel flow to the engine or engines thus enabling the pilot of the plane to adjust the fuel-air ratio of the engine or engines to provide the maximum power output thereof for the established constant rate of fuel flow. The invention further provides an effective, safe and fool-proof control for the apparatus herein described, which eliminates the possibility of the pilot "killing" the engine.

While a particular embodiment of each of the several features of the present invention has been illustrated and described herein, it is not intended that the invention be limited to such disclosure and changes and modifications may be made therein and thereto within the scope of the claims.

The invention described herein may be manufactured and used by the Government of the United States of America for governmental purposes without the payment of any royalties thereon or therefor.

I claim:

1. In the method of operating an internal combustion engine at optimum economy conditions for any given power condition, the steps which comprise establishing a condition of constant fuel flow to the engine, and then adjusting the ratio of the air-fuel mixture supplied to the engine to provide the maximum engine power output for the established constant rate of fuel flow thereto.

2. In the method of operating an internal combustion engine at optimum fuel economy for any given power condition, said engine having fuel feed and air induction carburetor systems associated therewith; the steps which comprise establishing and maintaining a condition of constant fuel flow through the fuel system to the air induction system and the engine, and then increasing the air-to-fuel ratio to increase the engine manifold pressure with accompanying increase in the power output of the engine until the engine power output ceases to increase with increases in engine manifold pressure.

3. In the method of operating an internal combustion engine at optimum fuel economy for any given power condition, said engine having fuel feed and air induction carburetor systems associated therewith; the steps which comprise establishing a desired engine speed and engine manifold pressure, establishing and maintaining a condition of constant fuel flow through the fuel system to the air induction system and the engine, and then increasing the air-to-fuel ratio to increase the engine manifold pressure with accompanying increase in the power output of the engine until the engine power output ceases to increase with increases in engine manifold pressure.

4. In the method of operating an internal combustion engine at optimum fuel economy for any given power condition, said engine having fuel feed and air induction carburetor systems associated therewith; the steps which comprise establishing and maintaining a condition of constant fuel flow through the fuel system to the air induction system and the engine, reducing the air-to-fuel ratio slightly to reduce the engine manifold pressure until the power output of the engine begins to drop, and then increasing the air-to-fuel ratio to increase the engine manifold pressure with accompanying increase in the power output of the engine until the engine power output ceases to increase with increases in the engine manifold pressure.

5. In the method of operating an internal combusion engine at optimum fuel economy for any given power condition, said engine having fuel feed and air induction carburetor systems associated therewith; the steps which comprise establishing and maintaining a condition of constant fuel flow through the fuel system to the air induction system and the engine, reducing the air-to-fuel ratio slightly to reduce the engine manifold pressure until the engine power output begins to drop, and then increasing the air-to-fuel ratio to increase the engine manifold pressure in predetermined increments with accompanying increase in the power output of the engine until the engine power output ceases to increase with increases in engine manifold pressure.

6. In the method of operating an internal combustion engine at optimum fuel economy for any given power condition, said engine having fuel feed and air induction carburetor systems associated therewith; the steps which comprise establishing and maintaining a condition of constant fuel flow through the fuel system to the air induction system and the engine, increasing the air-to-fuel ratio to increase the engine manifold pressure in predetermined increments with accompanying increase in the power output of the engine until the engine power output ceases to increase with increases in engine manifold pressure, further increasing the air-to-fuel ratio to increase the engine manifold pressure in similar predetermined increments until the engine power output again begins to drop to thereby determine the range of engine manifold pressures over which the engine power output is substantially constant, and then finally reducing slightly the air-to-fuel ratio to provide the engine manifold pressure well within said range of substantially constant engine power output.

7. In the method of operating an internal combustion engine at optimum fuel economy for any given power condition, said engine having fuel feed and air induction carburetor systems associated therewith; the steps which comprise establishing and maintaining a condition of constant fuel flow through the carburetion system to the air induction system and the engine, reducing the air-to-fuel ratio slightly to reduce the engine manifold pressure until the power output of the engine begins to drop, then increasing said air-to-fuel ratio to increase the engine manifold pressure in predetermined increments with accompanying increase in the power output of the engine until the engine power output ceases to increase with increases in engine manifold pressure, further increasing the air-to-fuel ratio to increase the engine manifold pressure in similar increments until the engine power output again begins to drop to thereby determine the range of engine manifold pressures over which the engine power output is substantially constant, and then finally reducing slightly the air-to-fuel ratio to provide an engine manifold pressure well within the said range of substantially constant engine power output.

8. In the method of operating an internal combustion engine at optimum fuel economy for any given power condition, said engine having fuel feed and air induction carburetor systems associated therewith; the steps which comprise establishing a desired engine speed and engine manifold pressure, setting the carburetion system for automatic lean operation of the engine, establishing and maintaining a condition of constant fuel flow through the fuel system to the air induction system and the engine, reducing the air-to-fuel ratio slightly to reduce the engine manifold pressure until the power output of the engine begins to drop, then increasing said air-to-fuel ratio to increase the engine manifold pressure in predetermined increments with accompanying increase in the power output of the engine until the engine power output ceases to increase with increases in engine manifold pressure, further increasing the air-to-fuel ratio to increase the engine manifold pressure in similar increments until the engine power output again begins to drop to thereby determine the range of engine manifold pressures over which the engine power output is substantially constant, and then finally reducing slightly the air-to-fuel ratio to provide an engine manifold pressure well within said range of substantially constant engine power output.

9. In the method of operating an internal combustion engine at optimum fuel economy conditions for any given power condition, said engine having fuel feed and throttle controlled air induction carburetor systems associated therewith; the steps which comprise establishing the desired engine speed and engine manifold pressure, setting the carburetion system for automatic lean operation of the engine, establishing a condition of constant fuel flow through the fuel system to the air induction system and the engine, closing the air induction throttle slightly to reduce the engine manifold pressure until the power output of the engine begins to drop, then opening said throttle slightly to increase the engine manifold pressure in predetermined increments with accompanying increase in the power output of the engine until the throttle is opened to a first point at which the engine power output ceases to increase with increases in engine manifold pressure, further opening said throttle to increase the engine manifold pressure in similar increments until the throttle is opened to a second point at which the engine power output again begins to drop to thereby determine the range of engine manifold pressures over which the engine power output is substantially constant, and then closing said throttle slightly to provide an engine manifold pressure well within said range of substantially constant engine power output.

10. In combination with an internal combustion engine having a fuel system including a valve assembly operable to control the flow of fuel to the engine, locking means operable to engage said valve assembly and secure the same in a fixed position to establish a condition of constant fuel flow to the engine, and control mechanism operable to actuate said locking means.

11. In combination with an internal combustion engine having a fuel feed system including a valve assembly normally operable to control the flow of fuel to the engine, locking means operable to secure the valve assembly in a fixed position to establish a condition of constant fuel flow to the engine comprising members arranged for clamping engagement with the valve assembly to secure the same in a fixed position, means normally maintaining said members in disengaged relation with respect to said valve assembly, and means to actuate said members into clamping engagement with said valve assembly.

12. In combination with an internal combustion engine having a fuel feed system including a valve assembly normally operable to control the flow of fuel to the engine, locking means operable to secure the valve assembly in a fixed position to establish a condition of constant fuel flow to the engine comprising members arranged for clamping engagement with said valve assembly to secure the same in a fixed position, spring means normally urging said members into disengaged relation with respect to said valve assembly, an element cooperable with said members to actuate the same into clamping engagement with said valve assembly, means operable to actuate said element relative to said members, and a second spring means tending normally to position said element relative to said members so that the latter are disengaged from the valve assembly.

13. In combination with an internal combustion engine having a fuel feed system including a valve assembly normally operable to control the flow of fuel to the engine, locking means operable to secure the valve assembly in a fixed position to establish a condition of constant fuel flow to the engine comprising members arranged for clamping engagement with said valve assembly to secure the same in a fixed position, spring means normally urging said members into disengaged relation with respect to said valve assembly, an element cooperable with said members to actuate the same into clamping engagement with said valve assembly, energizable means operable to actuate said element relative to said members, a second spring means tending normally to position said element relative to said members so that the latter are disengaged from the valve assembly, and means operable at will to energize said energizable means.

14. In combination with an internal combustion engine having a fuel feed system including a valve assembly normally operable to control the flow of fuel to the engine, locking means operable to secure the valve assembly in a fixed position to establish a condition of constant fuel flow to the engine comprising a pair of members pivotally mounted intermediate their ends about a common pivot, the ends of said members at one side of said pivot being arranged for clamping engagement with said valve assembly to secure the same in a fixed position, spring means normally urging said ends of the members outwardly from one another into disengaged relation with respect to said valve assembly, and an element cooperable with the opposite ends of said members, actuable to pivot the same in respectively opposite directions against the action of said spring means to move the ends of said levers at said one side of the pivot into clamping engagement with said valve assembly.

15. In combination with an internal combustion engine having a fuel feed system including a valve assembly normally operable to control the flow of fuel to the engine, locking means operable to secure the valve assembly in a fixed position to establish a condition of constant fuel flow to the engine comprising members pivotally mounted intermediate their ends about a common pivot, the ends of said members at one side of said pivot being arranged for clamping engagement with said valve assembly to secure the same in a fixed position, spring means normally urging said ends of the members outwardly from one another into disengaged relation with respect to said valve assembly, an element cooperable with the opposite ends of said members actuable to pivot the same in respectively opposite directions against the action of said spring means to move the ends of said members at said one side of the pivot into clamping engagement with said valve assembly, and means to actuate said element relative to said members.

16. In combination with an internal combustion engine having a fuel feed system including a valve assembly normally operable to control the flow of fuel to the engine, locking means operable to secure the valve assembly in a fixed position to establish a condition of constant fuel flow to the engine comprising members pivotally mounted intermediate their ends about a common pivot, the ends of said members at one side of said pivot being arranged for clamping engagement with said valve assembly to secure the same in a fixed position, spring means normally urging said ends of the members outwardly from one another into disengaged relation with respect to said valve assembly, an element cooperable with the opposite ends of said members actuable to pivot the same in respectively opposite directions against the action of said spring means to move the ends of said members at one side of the pivot into clamping engagement with said valve assembly, energizable means operable to actuate said element relative to said members, a second spring means operable when said energizable means is de-energized to position said element relative to said members so that the ends thereof at said one side are disengaged from the valve assembly, and means operable at will to energize said solenoid.

17. In a combination with an internal combustion engine having fuel feed and throttle controlled air induction carburetion systems associated therewith; said fuel feed system including a valve assembly operable to control the rate of fuel flow to the engine, locking means actuable to engage said valve assembly and maintain the same in a fixed position to establish a condition of constant fuel flow to said engine, energizable means operable to actuate said locking means; and an electric circuit comprising said energizable means and including a manually operable two-position switch and a circuit control mechanism operatively connected to the throttle and operable in one position of said switch to close said electrical circuit and energize said energizable means and maintain the same energized upon actuation of said switch to the other position thereof, said circuit control mechanism being operable automatically to open said electrical circuit and de-energize said energizable means upon movement of said throttle beyond a predetermined extent in either direction from the position thereof at the time said switch is first actuated to said one position.

ALLEN S. ATKINSON.

REFERENCES CITED

The following references are of record in the file of this patent:

UNITED STATES PATENTS

| Number | Name | Date |
|---|---|---|
| 1,998,581 | Holley | Apr. 23, 1935 |